United States Patent [19]
Shimer et al.

[11] 3,882,371
[45] May 6, 1975

[54] CYCLOCONVERTER TRIGGER TIMING SYSTEM

[75] Inventors: Daniel W. Shimer, Grosse Pointe Woods; Michael F. Matouka, Sterling Heights, both of Mich.

[73] Assignee: General Motors Corporation, Detroit, Mich.

[22] Filed: Apr. 8, 1974

[21] Appl. No.: 458,561

[52] U.S. Cl. ............... 321/61; 318/227; 318/230; 318/231; 321/2; 321/4; 321/65
[51] Int. Cl. ..................... H02m 5/44; H02p 5/40
[58] Field of Search ............ 321/2, 4, 5, 60, 61, 65, 321/69 R; 318/227, 230, 231; 307/252 N, 252 Q, 209, 247 R

[56] References Cited
UNITED STATES PATENTS

| | | | |
|---|---|---|---|
| 3,603,867 | 9/1971 | Cuenoud | 321/5 X |
| 3,624,472 | 11/1971 | Graham | 321/65 X |
| 3,641,418 | 2/1972 | Plette | 321/61 X |
| 3,689,813 | 9/1972 | Sawyer et al. | 318/231 X |
| 3,697,843 | 10/1972 | Riess | 318/230 X |
| 3,731,169 | 5/1973 | Burgholte et al. | 318/227 |
| 3,790,873 | 2/1974 | Witten | 321/4 X |

*Primary Examiner*—Gerald Goldberg
*Attorney, Agent, or Firm*—Howard N. Conkey

[57] ABSTRACT

A synchronized six-group controlled rectifier cycloconverter interconnnects a three-phase AC voltage source with a three-phase AC induction motor. A three-phase source reference sawtooth waveform is generated having a period equal to 180° of the three-phase AC voltage source with each phase having an instantaneous amplitude representing the firing angle of respective controlled rectifiers. A three-phase motor reference conventional or truncated sawtooth waveform with a fast falling trailing edge is generated having a period equal to 180° of the desired three-phase input to the induction motor with each phase having an instantaneous amplitude representing a desired firing angle of respective controlled rectifiers. Comparators compare the three-phase source reference waveforms and three-phase motor reference waveforms and generate signals denoting desired controlled rectifier trigger delay angles. A logic circuit is responsive to the comparator outputs for triggering the controlled rectifiers in each group of the cycloconverter in a phase controlled manner for 180° of the desired output cycle. The logic circuit further provides for a smooth transition of load current between controlled rectifier groups without erratic behavior or short circuits by triggering those controlled rectifiers at the beginning of a new group that would normally be conducting if this group had always been conducting and by inhibiting the triggering of the controlled rectifiers at the beginning of a new group which would conduct with controlled rectifiers triggered last in the old group.

3 Claims, 11 Drawing Figures

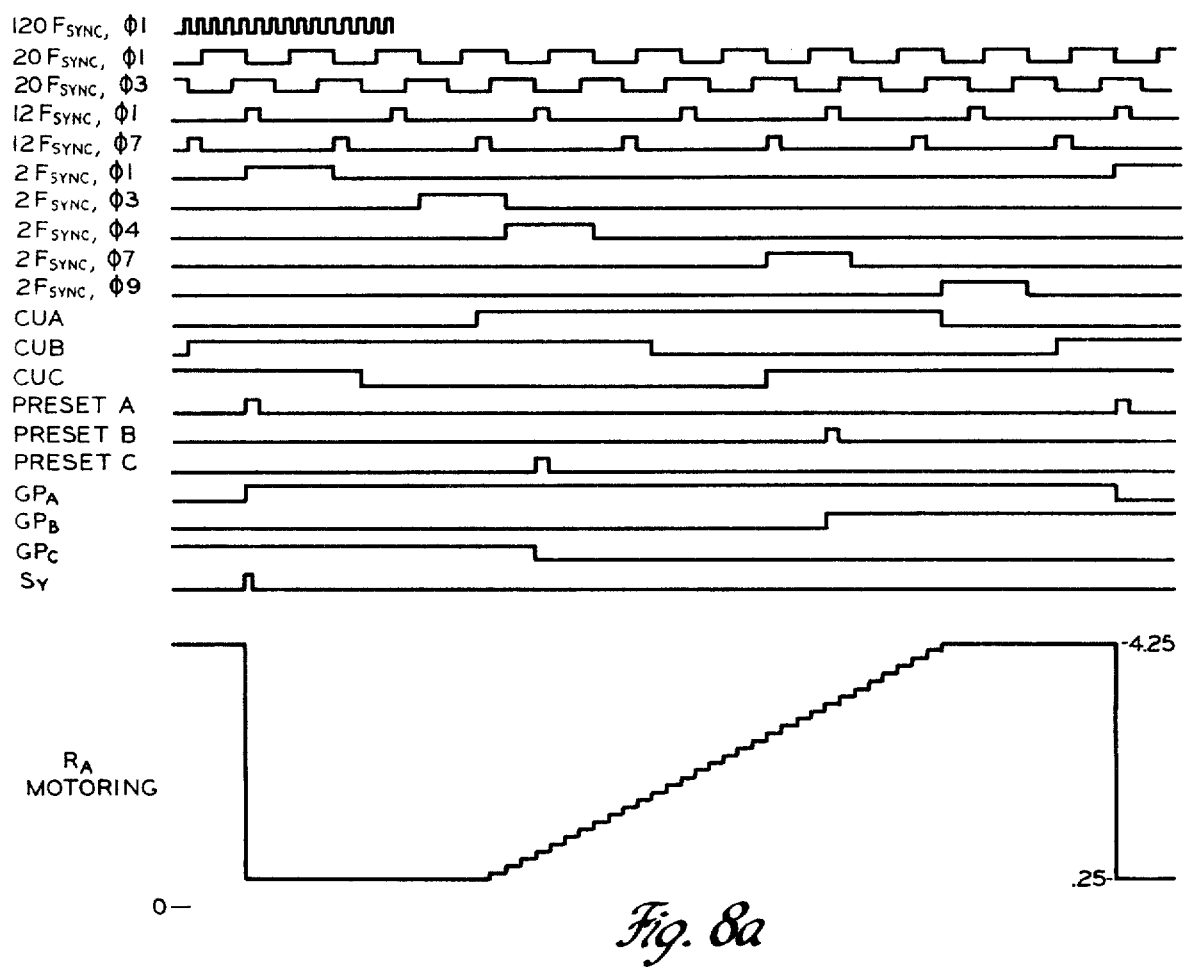
Fig. 8a
Fig. 8b
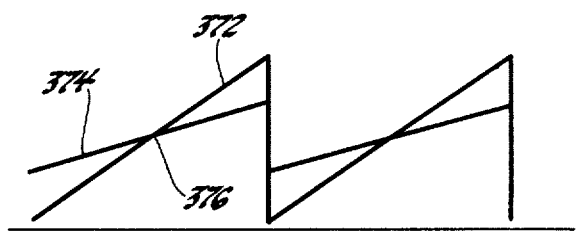
Fig. 9a
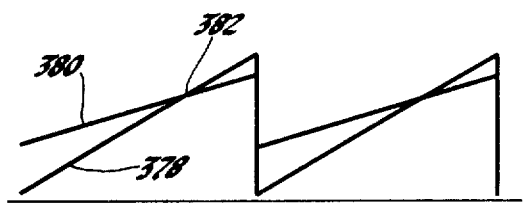
Fig. 9b

CYCLOCONVERTER TRIGGER TIMING SYSTEM

This invention relates to a synchronized triggering system for a cycloconverter which provides a three-phase AC output having controllable frequency and amplitude from a three-phase input and, more specifically, to an improved trigger system for such a cycloconverter which provides a smooth transition of load current between controlled rectifier groups without erratic behavior or short circuits.

Cycloconverters are generally known for use in motor control circuits to provide a controlled, variable frequency AC voltage from a fixed frequency AC source. In these known systems, positive and negative groups of controlled rectifiers are controlled by either a group triggering circuit or a synchronized triggering circuit. In each of these triggering circuits, the positive and negative groups of controlled rectifiers are alternately controlled at a frequency equal to the desired cycloconverter output frequency. In group triggering, the controlled rectifiers in each group are all simultaneously triggered as a group resulting in a rectangular output voltage waveshape. In synchronized triggering, the controlled rectifiers can be triggered at various controlled delay angles to generate nearly any output voltage waveshape including sinusoidal. It is to this type of triggering system that this invention is directed.

It is the general object of this invention to provide an improved cycloconverter synchronized triggering system.

It is another object of this invention to provide an improved synchronized triggering system for a cycloconverter which supplies an AC voltage to an induction motor having a controlled slip.

It is another object of this invention to provide an improved synchronized triggering system for a cycloconverter which includes a logic circuit for preventing short circuits of the AC source by monitoring the AC source voltage polarity and prior controlled rectifier conduction to inhibit the triggering of controlled rectifiers at the beginning of a new group which would conduct with controlled rectifiers triggered last in the old group.

It is another object of this invention to provide an improved synchronized triggering system for a cycloconverter which provides a smooth transition of load current between the positive and negative groups of controlled rectifiers.

The cycloconverter and triggering system therefore of this invention is used where there is partial knowledge of the load power factor such as in the case of an induction motor load with controlled slip. With this load power factor knowledge, the controlled rectifier trigger delay angles are varied throughout the output cycle in a programmed manner such that there is relatively low load current and at the end of a positive or negative controlled rectifier group triggering interval. The triggering system of this invention then provides a smooth transition of load current between positive and negative controlled rectifier groups without eratic behavior or short circuits and without the use of bulky intergroup transformers or load current sensing. This is accomplished by (1) controlling the trigger delay angles of the controlled rectifiers in each positive or negative group from the comparison of a source reference signal with a fast falling edge and a load reference signal having a fast falling edge at the beginning of each positive or negative controlled rectifier group triggering period and (2) a logic circuit which is responsive to signals indicating source voltage polarity and prior controlled rectifier conduction to inhibit the triggering of controlled rectifiers at the beginning of the new group which would conduct with the controlled rectifiers triggered last in the old group.

The objects of this invention may be best understood by reference to the following description of a preferred embodiment and the Figures in which:

FIG. 8 is a diagram illustrating the logic signals and the motor reference signal which are generated by the circuits of FIGS. 5, 6 and 7 during motoring and braking; and FIG. 9 is a diagram illustrating control of the motor reference waveform by the motor reference generator of FIG. 1.

Figure 1:
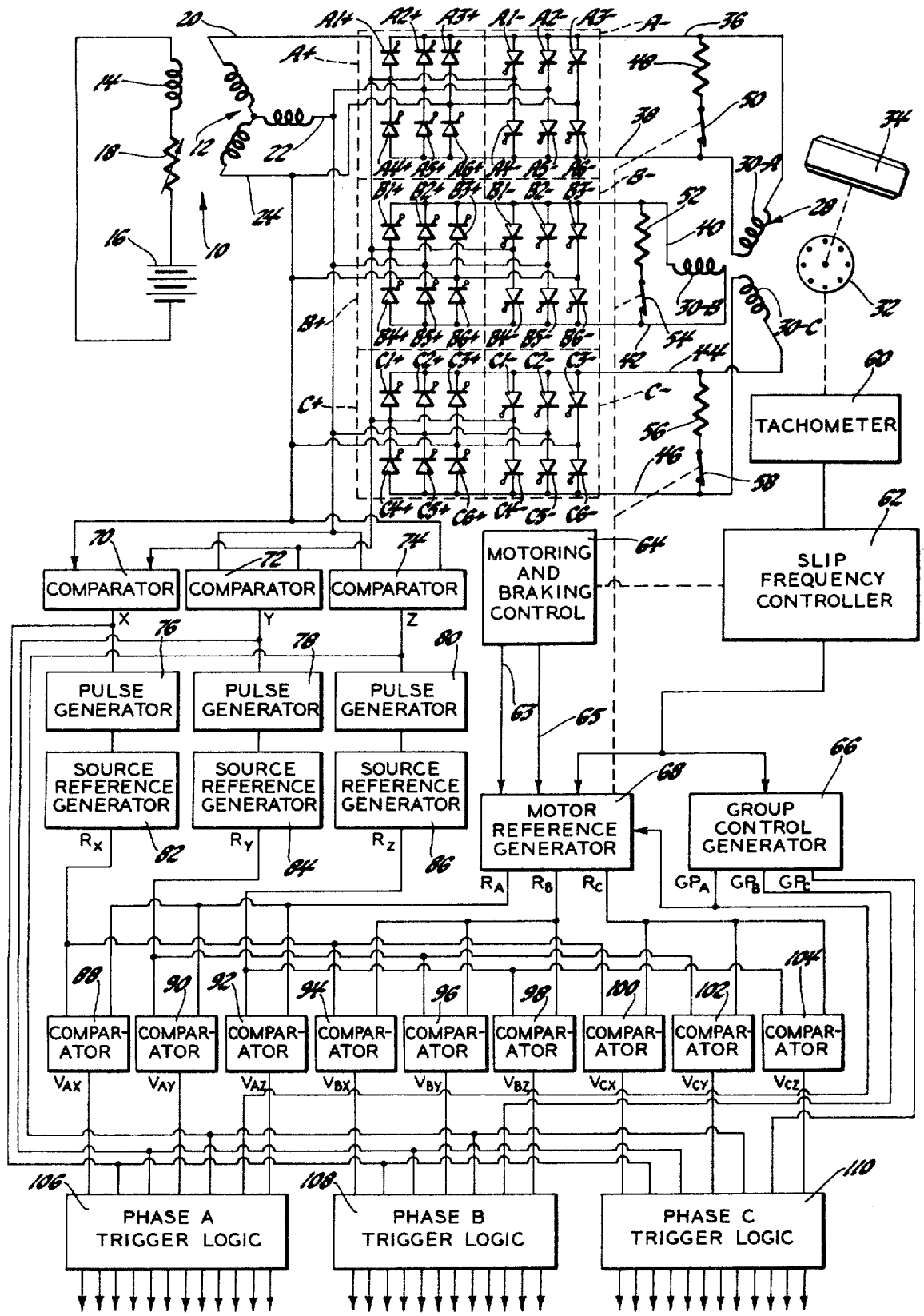
FIG. 1 is a system diagram of an induction motor power and braking system made in accordance with the principles of this invention.

Referring to the drawings and more particularly to FIG. 1, there is illustrated an electric propulsion system for a vehicle which includes a source of polyphase alternating current generally designated by reference numeral 10. This source of alternating current is a three-phase Y-connected generator having an output winding 12 and a filed winding 14. The field winding 14 is serially connected with a source of direct current 16 through a variable resistor 18. The variable resistor 18 provides for regulation of the current through the field winding 14 to thereby regulate the output voltage of the output winding 12. It is understood that the variable resistor 18 merely illustrates various field current control devices which could take a variety of forms such as a transistor voltage regulator.

The system to be described may be used for the electric propulsion of a vehicle such as an earthmover in which case the field winding 14 would be carried by the generator rotor (not illustrated) and driven by a prime mover such as a turbine or diesel (not illustrated). It is understood that the source of alternating current could be a three-phase commercial power source if the present invention were incorporated in a motor control system in a manufacturing facility.

Figure 2:
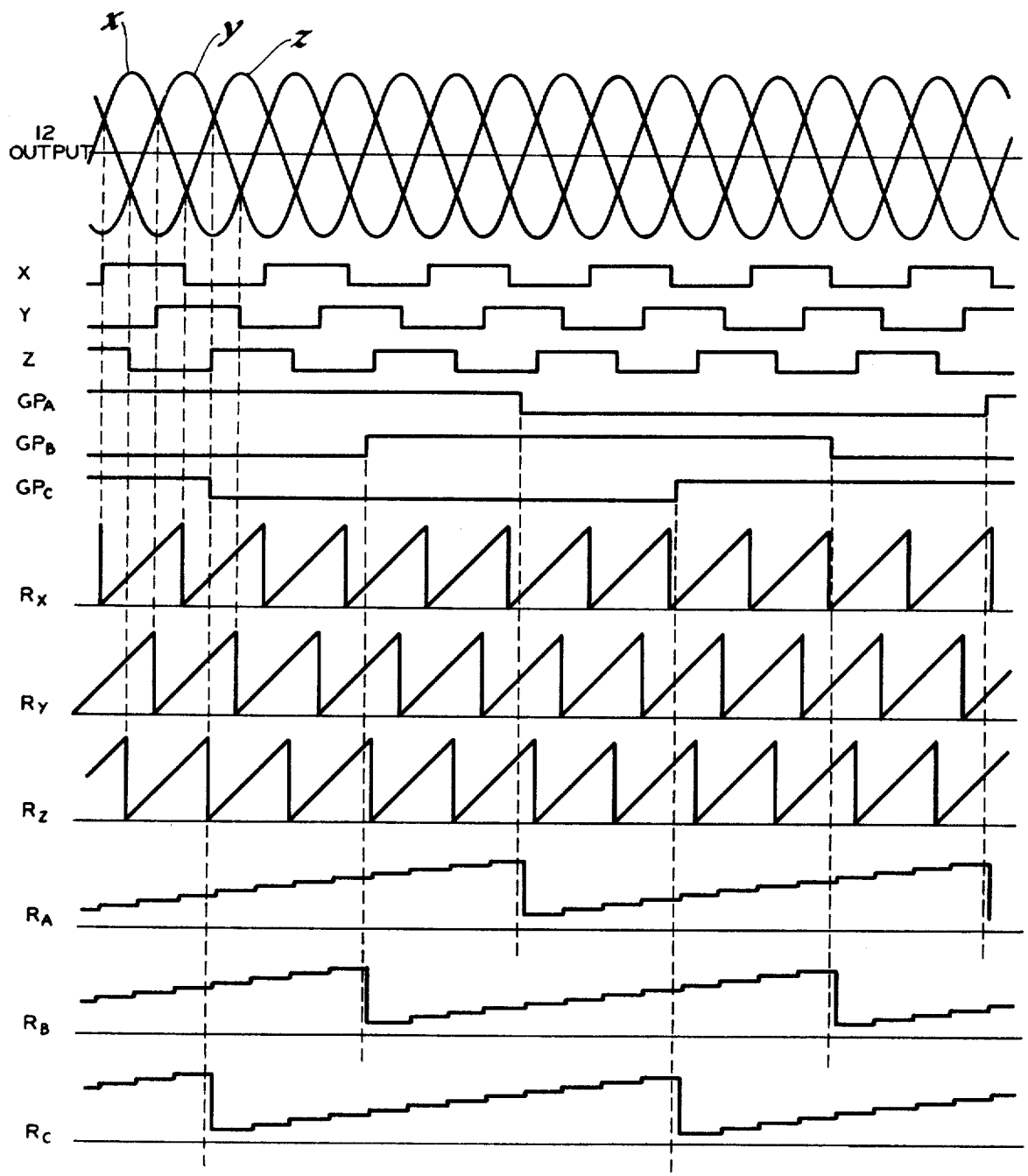
FIG. 2 is a diagram illustrating various voltage waveforms and their timed relationship as developed by the system of FIG. 1.

The output of the winding 12 comprises a three-phase line to neutral voltage having phases $x$, $y$ and $z$, as illustrated in FIG. 2, applied respectively to output conductors 20, 22 and 24. The frequency and amplitude of this three-phase voltage is determined by the operating conditions of the alternating current source 10. For purposes of the following discussion, the frequency and magnitude of the phase voltage $x$, $y$ and $z$ are assumed to be constant.

In the earthmover application, a three-phase induction motor 28 is used having phase windings 30-A, 30-B and 30-C to which a three phase voltage having phases A, B and C is applied to provide a drive power for vehicle propulsion. The induction motor 28 includes a rotor 32 which is coupled to a vehicle wheel 34 to drive the vehicle. The coupling between the rotor 32 and the wheel 34 may include a mechanical differential or other coupling means. In addition, it is understood that each wheel may be driven by a separate motor or a plurality of wheels may be driven from a single motor.

The cycloconverter includes six groups of controlled rectifiers A+, A−, B+, B−, C+ and C−, the groups being comprised of controlled rectifiers A1+ through A6+, A1− through A6−, B1+ through B6+, B1− through B6−, C1+ through C6+ and C1− through C6− respectively and each being connected in a full wave bridge rectifier configuration with the conductors 20, 22 and 24 being connected to respective inputs of each bridge.

The outputs of the two groups of controlled rectifiers A+ and A− are connected to the phase winding 30-A of the induction motor 28 via conductors 36 and 38. The set of controlled rectifiers A1+, A2+ are poled to supply current to the phase winding 30-A via the conductor 36, the set of controlled rectifiers A4+, A5+ and A6+ are poled to return from the phase winding 30-A to the winding 12 via the conductor 38, the set of controlled rectifiers A1−, A2− and A3− are poled to return current from the phase winding 30-A to the winding 12 via the conductor 36 and the set of controlled rectifiers A4−, A5− and A6− are poled to supply current to the phase winding 30-A via the conductor 38. By controlling the firing angles of the controlled rectifiers in the A+ and A− groups relative to the line to line voltages from the winding 12, as will be described, the phase A voltage is generated and supplied to the phase winding 30-A.

In like manner, the outputs of the two groups of controlled rectifiers B+ and B− are connected to the phase winding 30-B via the conductors 40 and 42 and the outputs of the two groups of controlled rectifiers C+ and C− are connected to the phase winding 30-C via the conductors 44 and 46.

A braking grid resistor 48 is a series connected with a contactor 50 across the conductors 36 and 38, a braking grid resistor 52 is series connected with a contactor 54 across the conductors 40 and 42 and a braking grid resistor 56 is series connected with a contactor 58 across the conductors 44 and 46. When it is desired to operate the induction motor 28 for motoring, the contactors 50, 54 and 58 are opened. Conversely, when it is desired to operate the induction motor 28 as a brake, the contactors 50, 54 and 58 are closed to connect the braking grid resistors 48, 52 and 56 in parallel with the respective phase winding 30-A, 30-B and 30-C.

To provide for motoring or braking, the six groups of controlled rectifiers A+, A−, B+, B−, C+ and C− are controlled so as to apply the three-phase voltage having phases A, B and C to the respective phase windings 30-A, 30-B, and 30-C.

The induction motor 28 is operated at a controlled slip frequency during motoring and braking with the desired frequency input $F_{sync}$ to the phase windings 30-A, 30-B and 30-C being determined by means of a tachometer 60, a slip frequency controller 62 and a motoring and braking control 64. The tachometer 60 is mechanically associated with the rotor 32 of the induction motor 28 and is responsive to the rotation thereof for generating a series of voltage pulses having a frequency $J(F_m)$, where J is a constant and $F_m$ divided by the number of motor pole pairs is the rotational speed of the rotor 32. The tachometer 60 can take a variety of known forms including a toothed wheel and a pickup coil.

The output voltage pulses from the tachometer 60 are supplied to the slip frequency controller 62 which, under the control of the motoring and braking control 64 generates a series of voltage pulses having a frequency $J(F_{sync})$ where $F_{sync} = F_m + F_{slip}$ and $F_{slip}$ is the desired slip frequency of the induction motor 28. When the induction motor 28 is used for motoring, the slip frequency $F_{slip}$ is positive and when the induction motor 28 is being operated as a brake, the slip frequency $F_{slip}$ is a negative value. The motoring and braking control 64 controls the slip frequency controller 62 to provide for the positive or negative slip as a function of vehicle operator demand. In addition, the motoring and braking control 64 functions in response to operator demand during braking to close the contactors 50, 54 and 58. The aforementioned functions of the slip frequency controller 62 and the motoring and braking control 64 may be accomplished as illustrated in the U.S. Pat. No. Salihi et al 3,688,171 which issued on Aug. 29, 1972 and which is assigned to the assignee of this invention. The motoring and braking control 64 further functions in response to operator demand to supply a logic "1" signal for motoring and a logic "0" signal for braking on an output line 63 and to supply a gain control signal having a magnitude $V_G$ representing a desired braking or motoring demand on an output line 65.

The voltage pulses from the slip frequency controller 62 at the frequency $J(F_{sync})$ is supplied to a group control generator 66 and a motor reference generator 68.

The group control generator 66 is responsive to the voltage pulses supplied thereto for generating three group signals $GP_A$, $GP_B$ and $GP_C$ as illustrated in FIG. 2, each of which is a square wave at the desired frequency $F_{sync} = F_m + F_{slip}$ and further which are displaced 120° from one another. The group control generator 66 may take the form of counters and appropriate logic elements to generate the three group signals $GP_A$, $GP_B$ and $GP_C$. The group signal $GP_A$ is further supplied to the motor reference generator 68 to synchronize the operation of the motor reference generator 68 with the group signals $GP_A$, $GP_B$ and $GP_C$.

The motor reference generator 68 generates three motor reference signals $R_A$, $R_B$ and $R_C$ each having a period equal to 180° of the desired input voltage to the induction motor 28 and consequently equal to 180° of the group reference signals $GP_A$, $GP_B$ and $GP_C$ and each having a fast falling trailing edge at the beginning of each period. Each of the motor reference signals $R_A$, $R_B$ and $R_C$ takes the form of a series of sawtooth waveforms of the conventional type during braking or of the truncated type during motoring. For purposes of illustration, it will hereinafter be assumed that the induction motor 28 is being operated as a brake so that the motor reference signals $R_A$, $R_B$ and $R_C$ are sawtooth waveforms of the conventional type as illustrated in FIG. 2.

The instantaneous amplitude of each of the motor reference signals $R_A$, $R_B$ and $R_C$ represents the desired firing delay angle of controlled rectifiers in the respective group pairs A+ and A−, B+ and B−, C+ and C−. The group signal $GP_A$ supplied to the motor reference generator 68 functions to synchronize the motor reference signals $R_A$, $R_B$ and $R_C$ with the group signals $GP_A$, $GP_B$ and $GP_C$ respectively, as seen in FIG. 2, so that the period of each motor reference signal $R_A$, $R_B$ and $R_C$ substantially coincides with each 180° segment of the respective group reference signal $GP_A$, $GP_B$ and $GP_C$. As seen in FIG. 2, the motor reference signals $R_A$, $R_B$ and $R_C$ are digitally synthesized sawtooth wave forms each having a fast falling trailing edge occurring within a short time period following each 180° segment of the corresponding group signal $GP_A$, $GP_B$ or $GP_C$. The fast falling trailing edge of the motor reference signals $R_A$, $R_B$ and $R_C$ make possible one of the features of this invention, namely, the smooth transition of load current between each of the pairs of controlled rectifier groups associated with each phase winding of the induction motor 28. Although the sawtooth waveforms of the motor reference signals $R_A$, $R_B$ and $R_C$ are illustrated as being digitally constructed, other methods of generating these waveforms may be utilized.

Conductors 20 and 24 connect phase voltages x and z to respective inputs of a comparator 70, conductors 20 and 22 connect phase voltages x and y to respective inputs of a comparator 72 and conductors 22 and 24 connect phase voltages y and z to respective inputs of a comparator 74. The comparators 70, 72 and 74 generate respective square wave signals X, Y and Z illustrated in FIG. 2 which are synchronism with the zero voltage crossings between the conductors 20 and 24, 20 and 22, and 22 and 24 respectively. Each state of the square wave signals X, Y and Z represents the firing angle range of a respective controlled rectifier in each of the groups A+, A−, B+, B−, C+ and C−. The square wave signal X, Y and Z are connected to respective pulse generators 76, 78 and 80. The pulse generators 76, 78 and 80 are responsive to the square wave signals X, Y and Z for producing a positive voltage pulse upon each leading and trailing edge of the respective square wave signals X, Y and Z. The pulse output of the pulse generators 76, 78 and 80 are connected to respective source reference generators 82, 84 and 86.

The source reference generators 82, 84 and 86 are responsive to the pulse inputs thereto for generating threephase source reference signals $R_X$, $R_Y$ and $R_Z$ comprised of series of waveforms each having a fast falling edge illustrated in the preferred embodiment as sawtooth waveforms of the conventional type which are in synchronism with zero line-to-line voltage crossovers of the voltages between the conductors 20 and 24, 20 and 22, and 22 and 24 respectively as seen in FIG. 2. These sawtooth source reference signals $R_X$, $R_Y$ and $R_Z$ have a constant peak amplitude at all frequencies of the output of the source of alternating current 10. The instantaneous magnitude of each of the sawtooth waveforms in the source reference signals $R_X$, $R_Y$ and $R_Z$ is proportional to the firing delay angle of respective controlled rectifiers in the controlled rectifier groups A+, A−, B+, B−, C+ and C−.

The source reference generators 82, 84 and 86 each may take the form of the sawtooth generator described in the U.S. Pat. No. Salihi et al 3,659,168 which issued on Apr. 25, 1972 and which is assigned to the assignee of the present invention.

Figure 4:
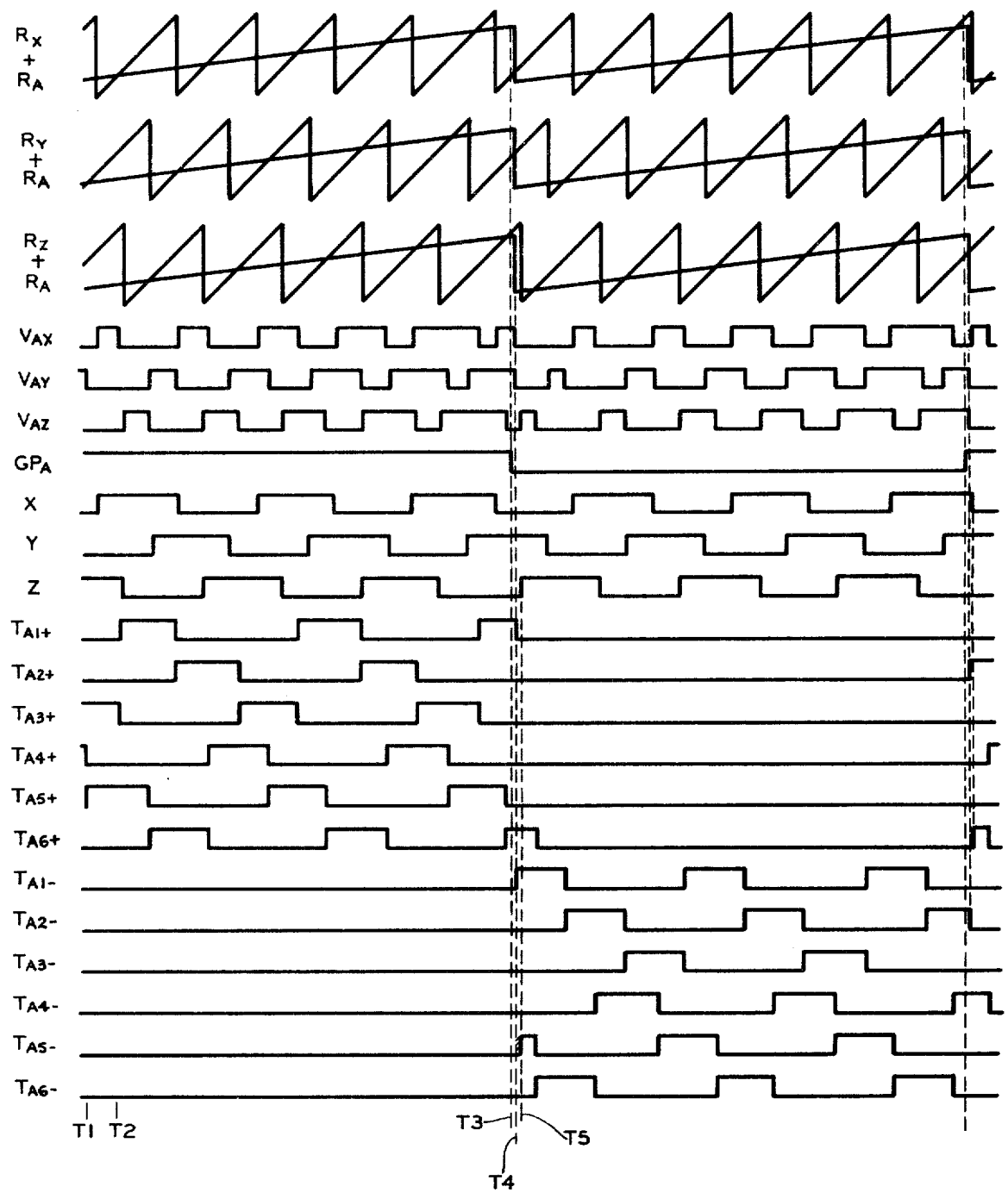
FIG. 4 is a diagram illustrating the voltage waveforms and their timed relationship developed by the logic system of FIG. 3.

The motor reference signal $R_A$ is compared with each of the source reference signals $R_X$, $R_Y$ and $R_Z$ in comparators 88, 90 and 92 respectively. The resulting logic signals $V_{AX}$, $V_{AY}$ and $V_{AZ}$ are illustrated in FIG. 4 and are in synchronism with the desired firing angles of the controlled rectifiers in the groups A+ and A−. The motor reference signal $R_B$ is compared with each of the source reference signals $R_X$, $R_Y$ and $R_Z$ in comparators 94, 96 and 98 respectively. The resulting logic signals $V_{BX}$, $V_{BY}$ and $V_{BZ}$ are synchronism with the desired firing angles of the controlled rectifiers in the groups B+ and B−. The motor reference signal $R_C$ is compared with the source reference signals $R_X$, $R_Y$ and $R_Z$ in comparators 100, 102 and 104 respectively to generate logic signals $V_{CX}$, $V_{CY}$ and $V_{CZ}$ which are in synchronism with the desired firing angles of the controlled rectifiers in the groups C+ and C−.

The outputs of the comparators 88, 90 and 92 are supplied to a phase A trigger logic circuit 106, the outputs of the comparators 94, 96 and 98 are supplied to a phase B trigger logic circuit 108 and the outputs of the comparators 100, 102 and 104 are supplied to a phase C trigger logic circuit 110. The square wave signals X, Y and Z are each connected to the phase A, B and C trigger logics 106, 108 and 110. The group signal $GP_A$ is connected to the phase A trigger logic 106, the group signal $GP_B$ is connected to the phase B trigger logic 108 and the group signal $GP_C$ is connected to the phase C trigger logic 110.

The phase A trigger logic 106 processes the input signals thereto to obtain the trigger signals for the controlled rectifiers in the groups A+ and A− to generate the phase A alternating voltage applied to the phase winding 30-A of the induction motor 28. In like manner, the phase B trigger logic 108 and phase C trigger logic 110 process the respective signal inputs thereto and generate the trigger signals for the controlled rectifiers in the groups B+ and B− and C+ and C− respectively to generate the phase B and C alternating voltages applied to the phase windings 30-B and 30-C respectively. The periods of the phase A, B and C currents coincide respectively with the group signals $GP_A$, $GP_B$ and $GP_C$ and as such are 120° phase displaced from one another.

Figure 3:
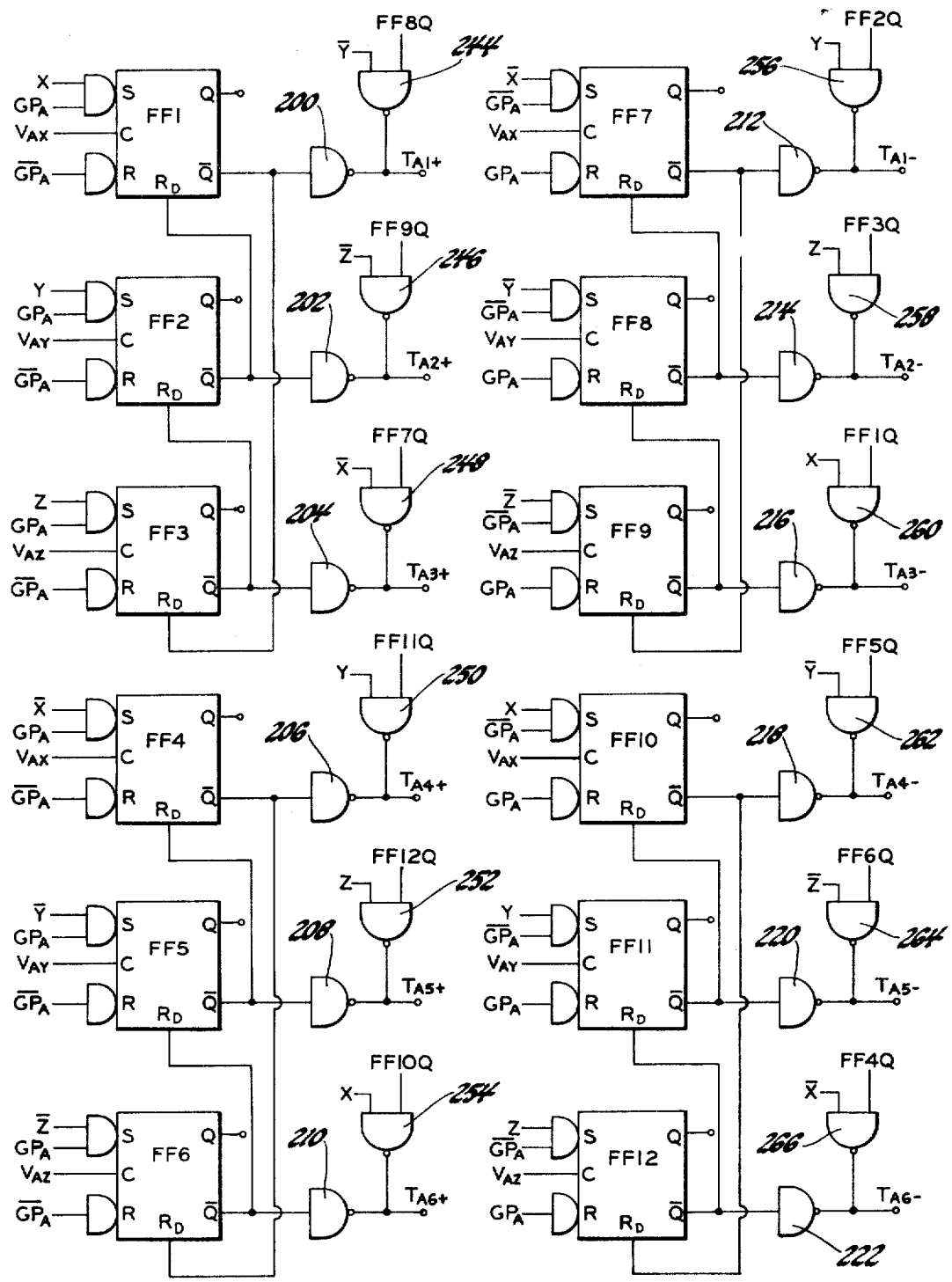
FIG. 3 is a circuit diagram of the trigger logic circuit associated with one of the phases of the cycloconverter output.

Referring to FIGS. 3 and 4, the phase A trigger logic circuit 106 includes a plurality of flip-flops FF1 through FF12. Each of the flip-flops includes a two input AND gate controlled set input, a clock input, a single input AND gate controlled reset input, a direct reset input, a Q output and a $\bar{Q}$ output. The flip-flops FF1 through FF12 are of the wellknown type wherein the Q output is set to a logic 1 when the clock input changes from a logic 1 to a logic 0 while the set input is a logic 1. These flip-flops are also reset when the clock input changes from a logic 1 to a logic "0" while the reset input is a logic 1. Further, an input to the direct reset input changing from a logic 1 to a logic 0 resets the flip-flop.

The flip-flops FF1 through FF6 are enabled by the group signal $GP_A$ which is supplied to one input of the AND gate at the respective set inputs and the inverse of which is applied to the AND gate input of the respective reset inputs. While the group signal $GP_A$ is a logic 1, the flip-flops FF1 through FF6 are each set when the remaining input to the AND gate coupled to the set input of the flip-flops is a logic 1 and the clock input thereof changes from a logic 1 to a logic 0.

The signals X, Y and Z are supplied respectively to the remaining inputs of the AND gates at the set inputs of the flip-flops FF1 through FF3. The logic signals $V_{AX}$, $V_{AY}$ and $V_{AZ}$ are supplied to the respective clock inputs of the flip-flops FF1 through FF3. The $\overline{Q}$ output of flip-flop FF1 is coupled to the direct reset of the flip-flop FF3, the $\overline{Q}$ output of the flip-flop FF2 is coupled to the direct reset input of the flip-flop FF1 and the $\overline{Q}$ output of the flip-flop FF3 is coupled to the direct reset input of the flip-flop FF2. As can be seen, the flip-flops FF1 through FF3 are coupled in a ring counter configuration. For example, when flip-flop FF2 is set, the Q output thereof resets flip-flop FF1.

The flip-flops FF4 through FF6 are coupled in identical manner as the respective flip-flops FF1 FF3 with the exception that the signals $\overline{X}$, $\overline{Y}$ and $\overline{Z}$ replace the respective signals X, Y and Z.

The $\overline{Q}$ output of the flip-flop FF1 is coupled to the input of a NAND gate 200 which functions as an inverter whose output constitutes the trigger signal for the controlled rectifier A1+ in group A+. In like manner, the $\overline{Q}$ outputs of the flip-flops FF2 through FF6 are coupled to respective NAND gates 202, 204, 206, 208 and 210 whose outputs constitute the trigger signals for the control rectifiers A2+, A3+, A4+, A5+ and A6+ respectively in group A+.

The flip-flops FF7 to FF12 are enabled when the group signal $GP_A$ is at a logic 0 by the coupling of the group signal $GP_A$ to the input of the AND gate at the reset inputs of the flip-flops FF7 through FF12 and the inverse thereof to one of the inputs of the AND gates at the set inputs thereof. As with flip-flops FF1 through FF6, the flip-flops FF7 through FF12 are set when the remaining input of the AND gate at the set inputs thereof is a logic 1 and the clock input changes from a logic 1 to a logic 0. The inputs to the AND gates at the set and reset inputs of the flip-flops FF7 through FF12 are the inverse of corresponding inputs of the flip-flops FF1 through FF6 respectively. The clock inputs of the flip-flops FF7 through FF12 are the same as the respective inputs of the flip-flops FF1 through FF6. In addition, the flip-flops FF7 through FF9 and the flip-flops FF10 through FF12 are coupled in a ring counter configuration as the flip-flops FF1 through FF3. The $\overline{Q}$ outputs of the flip-flops FF7 through FF12 are coupled to respective inputs of NAND gates 212, 214, 216, 218, 220 and 222. The outputs of the NAND gates 212 through 222 constitute the trigger signals for the controlled rectifiers A1− through A6− respectively in group A−.

As can be seen in FIG. 3, the flip-flops FF1 through FF6 are enabled to generate trigger signals for the controlled rectifier group A+ during the first 180° segment of the group reference signal $GP_A$ and the flip-flops FF7 through FF12 are enabled to generate trigger signals for the controlled rectifier group A− during the second 180° segment of the group signal $GP_A$. Further, the flip-flops FF1 through FF6 are selectively enabled by the square wave signals X, Y and Z either directly or inverted to generate trigger signals for the controlled rectifier group A+ as are the flip-flops FF7 through FF12 enabled thereby to generate trigger signals for the controlled rectifier group A−. Each of the trigger signals are coupled by conventional means such as pulse transformers to the control electrode of the respective controlled rectifier in groups A+ and A− which are gated conductive thereby.

Except as will hereinafter be described with respect to the inhibiting of the respective trigger signals for controlled rectifiers A1+ through A6+ and A1− through A6−, the controlled rectifiers in groups A+ and A− are selectively gated conductive to supply an alternating voltage to the phase winding 30-A as follows with reference to FIGS. 3 and 4. The motor reference signal $R_A$ is superimposed on each of the source reference signals $R_X$, $R_Y$ and $R_Z$ in FIG. 4 so as to clearly illustrate the function and outputs of the comparators 88, 90 and 92 of FIG. 1. Further, the motor reference signal $R_A$ is illustrated as a straight line approximation of the digital sawtooth waveforms of FIG. 2 for illustration purposes.

As seen in FIG. 4, the signals $V_{AX}$, $V_{AY}$ and $V_{AZ}$ are supplied by the comparators 88, 90 and 92 respectively, and become a logic 1 when the motor reference signal $R_A$ exceeds the magnitude of the source reference signals $R_X$, $R_Y$ and $R_Z$ respectively. These signals $V_{AX}$, $V_{AY}$ and $V_{AZ}$, and particularly their trailing edges, represent the trigger signals for the controlled rectifiers in groups A+ and A−.

Beginning at time T1 in FIG. 4, the group signal $GP_A$ is a logic 1 to enable the flip-flops FF1 through FF6 and disable the flip-flops FF7 through FF12. At time T1, $V_{AY}$ changes from a logic 1 to a logic 0 while square wave signal Y is a logic 0 to set flip-flop FF5 which resets flip-flop FF4 through the direct reset input thereof. The output of the NAND gate 208 shifts from logic 0 to a logic 1 which constitutes the trigger signal for the controlled rectifier A5+ which is gated into conduction. At time T2, the signal $V_{AX}$ shifts from a logic 1 to a logic 0 while the square wave signal X is a logic 1. Consequently the flip-flop FF1 is set which resets flip-flop FF3 to change the trigger signal for the controlled rectifier A3+, which was previously a logic 1, to a logic 0. Upon the setting of flip-flop FF1, the output of the NAND gate 200 changes from logic 0 to a logic 1 which constitutes the trigger signal for the controlled rectifier A1+. In the aforementioned manner, the flip-flops FF1 through FF6 are periodically set and reset to generate the trigger signals for the controlled rectifiers A1+ through A6+ in group A+ during the period that the group signal $GP_A$ is a logic 1 to supply 180° of the phase A voltage and current signals to the phase winding 30-A.

At time T3, the group signal $GP_A$ changes from a logic 1 to a logic 0 to enable the flip-flops FF7 through FF12 and disable the flip-flops FF1 through FF6. A short time thereafter, at time T4, the fast falling trailing edge of the motor reference signal $R_A$ occurs. Simultaneously therewith, the signals $V_{AX}$ and $V_{AY}$ which were each previously at logic 1 change to logic 0. As prior to time T4 flip-flop FF1 was set, and since the inverse of group signal $GP_A$ is a logic 1 at time T4, the flip-flop FF1 is reset as the signal $V_{AX}$ changes from logic 1 to logic 0 to change the trigger signal for the control rectifier A1+ from logic 1 to logic 0. Since $V_{AZ}$ remains unchanged at logic 0 through time T3 and T4, the flip-flop FF6 remains set and the trigger signal for controlled rectifier A6+ remains at logic 1 in the new group.

Upon the shifting of the signal $V_{AX}$ from a logic 1 to a logic 0 at time T4, the flip-flop FF7 is set since its two set inputs are at logic 1. Consequently, the output of the NAND gate 212 changes from a logic 0 to a logic 1 to generate a trigger signal for the controlled rectifier A1− in group A−.

In the circuit previously described, the changing of the signal $V_{AY}$ from logic 1 to logic 0 at time T4 would set the flip-flop FF11 to generate a trigger signal for the controlled rectifier A5− at the output of the NAND gate 220. The fast falling trailing edge of the motor reference signal $R_A$ at time T4 results in the switching of the signals $V_{AX}$ and $V_{AY}$ from a logic 1 to a logic 0 and therefore the generation of trigger signals at the output of NAND gates 212 and 220 for controlled rectifiers A1− and A5−. These two trigger signals for A1− and A5− would have existed had the group signal $GP_A$ been a logic 0 for all times prior to T4 and if motor reference $R_A$ had been equal to its value at T4 for all times prior to T4. Therefore, the fast falling trailing edge of the motor reference $R_A$ results in the generation of the proper triggers at time T4 for a smooth transition of load current between controlled rectifier groups without erratic behavior since those controlled rectifiers at the beginning of a new group are triggered that would normally be conducting had this group always been conducting. However, if the controlled rectifier A5− were allowed to conduct for the case illustrated in FIG. 4, a short circuit condition would result between the controlled rectifiers A5− and A6+ since phase voltage Y at the output of the winding 12 on conductor 22 is more positive than phase voltage z at the output of the winding 12 on conductor 24 as illustrated in FIGS. 1 and 2. As can be seen, this condition exists until time T5 at which time phase voltage z becomes more positive than phase voltage y and the square wave signal Z shifts from logic 0 to a logic 1 at the output of comparator 74 of FIG. 1.

To prevent the short circuit between the controlled rectifiers A5− and A6+ and further to prevent all possible short circuits which could occur upon the transition between group A+ and A−, inhibiting circuits are provided in FIG. 3 for inhibiting the trigger signals during the time period that a possible short circuit condition exists.

The $\overline{Q}$ outputs of the flip-flops FF1 through FF6 or FF7 through FF12 which remain a logic 1 after a state change in the group signal $GP_A$ indicate which controlled rectifiers were last to be triggered in the previous group A+ or A−. In addition, the square wave signals X, Y and Z provide an indication of the line to line polarity of the voltages between the lines 20, 22 and 24. These signals are combined logically to generate inhibit signals for inhibiting those trigger signals which may cause short circuits.

As seen in FIG. 3, the inhibit circuits include NAND gates 244 through 266 whose outputs are connected respectively to the outputs of the NAND gates 200 to 222. To inhibit the trigger signal for the controlled rectifier A5− and thus prevent the short circuit condition illustrated in FIG. 4, the inverse of the square wave signal Z and the Q output of the flip-flop FF6 are applied to the inputs of the NAND gate 264 to maintain the trigger signal for the controlled rectifier at logic 0 while phase y voltage of phase winding 12 is more positive than phase z voltage during the generation of a trigger signal for the controlled rectifier A6+.

Referring to FIG. 3, at time T4 the inverse of the logic signal Z is a logic 1 and the Q output of flip-flop FF6 is also a logic 1. Consequently, the output of the NAND gate 264 is a logic 0 to inhibit the generation of the trigger signal for the controlled rectifier A5− until time T5 at which time the inverse of the square wave signal Z shifts to a logic zero indicating the polarities of the voltages between the conductors 22 and 24 are no longer such as would create a short circuit between the controlled rectifiers A5− and A6+. Therefore, at time T5, the inhibit signal at the output of the NAND gate 264 is removed to permit the generation of the trigger signal for the controlled rectifier A5−. In like manner, the appropriate signals as indicated in FIG. 3 are applied to the inputs of the NAND gates 244 through 262 and 266 to prevent all other possible short circuits.

While the group signal $GP_A$ is a logic 0, the trigger signals for the controlled rectifiers A1− through A6− are generated in the same manner as the trigger signals for the controlled rectifiers A1+ through A6+ to supply the second 180° of the phase A current and voltage to the phase winding 30-A. As the group A+ and A− each are controlled during respective 180° segments of the group signal $GP_A$ and since the frequency of the group signal $GP_A$ is controlled by the slip frequency controller 62 to the desired frequency $F_{sync}$, the frequency of the voltage and current supplied to the coil 30-A by the groups A+ and A− is equal to the desired frequency $F_{sync}$.

The controlled rectifier groups B+ and B−, and C+ and C− are controlled in the same manner as the controlled rectifiers in groups A+ and A− in response to the motor reference signals $R_B$, $R_C$ and the group signals $GP_B$ and $GP_C$ to generate the phase B and C voltages and currents supplied to the respective phase coils 30-B and 30-C. As the motor reference signals $R_A$, $R_B$ and $R_C$ and the group signals $GP_A$, $GP_B$ and $GP_C$ are displaced 120° from one another, the phase A, B and C voltages and currents supplied to the phase coils 30-A, 30-B and 30-C comprise a three-phase alternating voltage and current having a frequency determined by the motoring and braking programmer 62.

Reversal of the induction motor 28 has not been illustrated, it being obvious to one skilled in the art to provide a motor reverse signal in response to operator demand and appropriate logic to reverse the sequence of the phase B and C signals. In general, this is accomplished by interchanging the group signals $GP_B$ and $GP_C$ in the group control generator 66 and by interchanging motor reference signals $R_B$ and $R_C$. The interchanging could be done mechanically with relays but preferably it is accomplished electrically with logic gates.

Figures 5, 6:
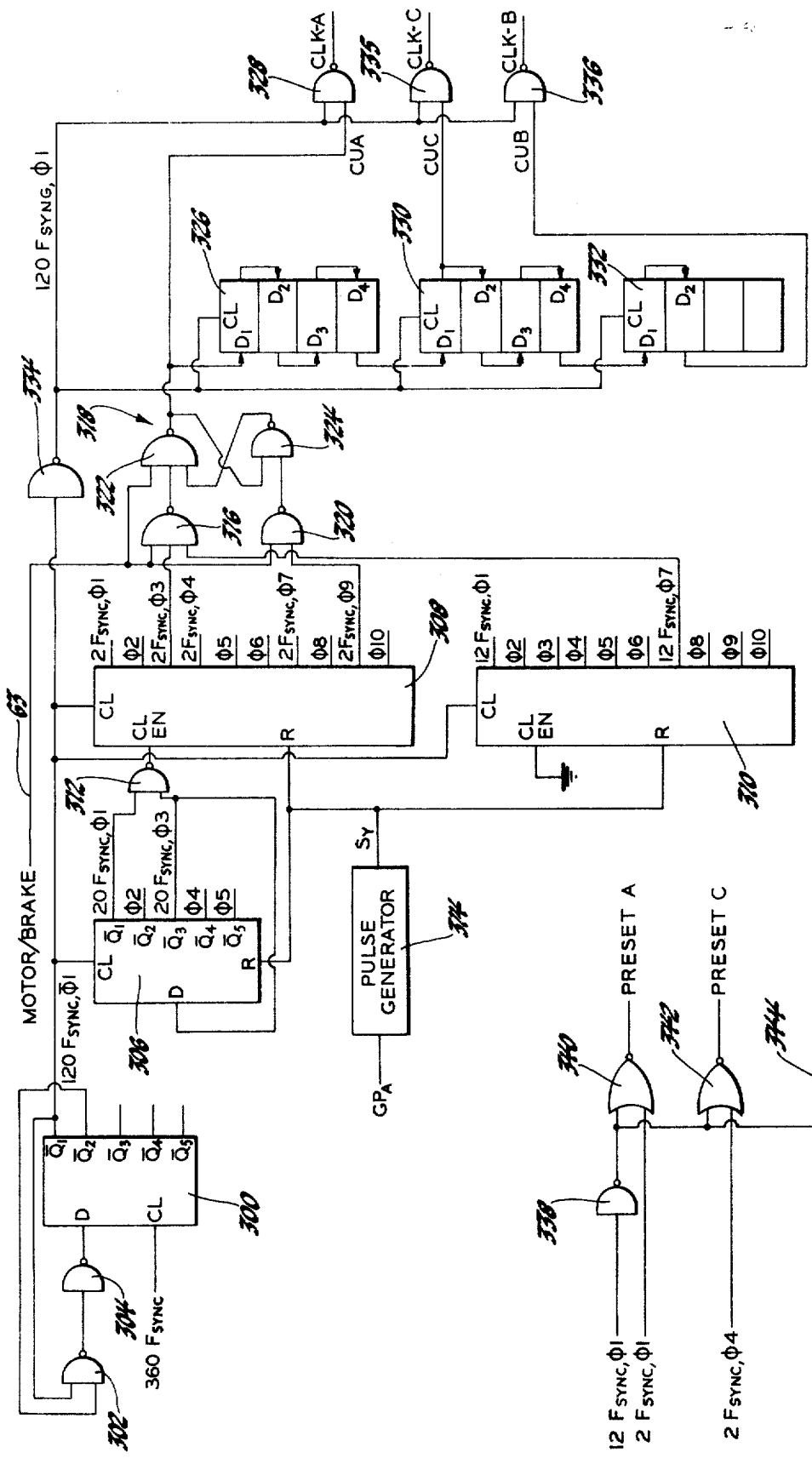
FIG. 5 is a circuit diagram of the input circuit of the motor reference generator of FIG. 1 for generating clocking signals for the phase A, B and C counters.
FIG. 6 is a logic circuit in the motor reference generator of FIG. 1 for generating preset signals for the phase A, B and C counters.
Figure 7:
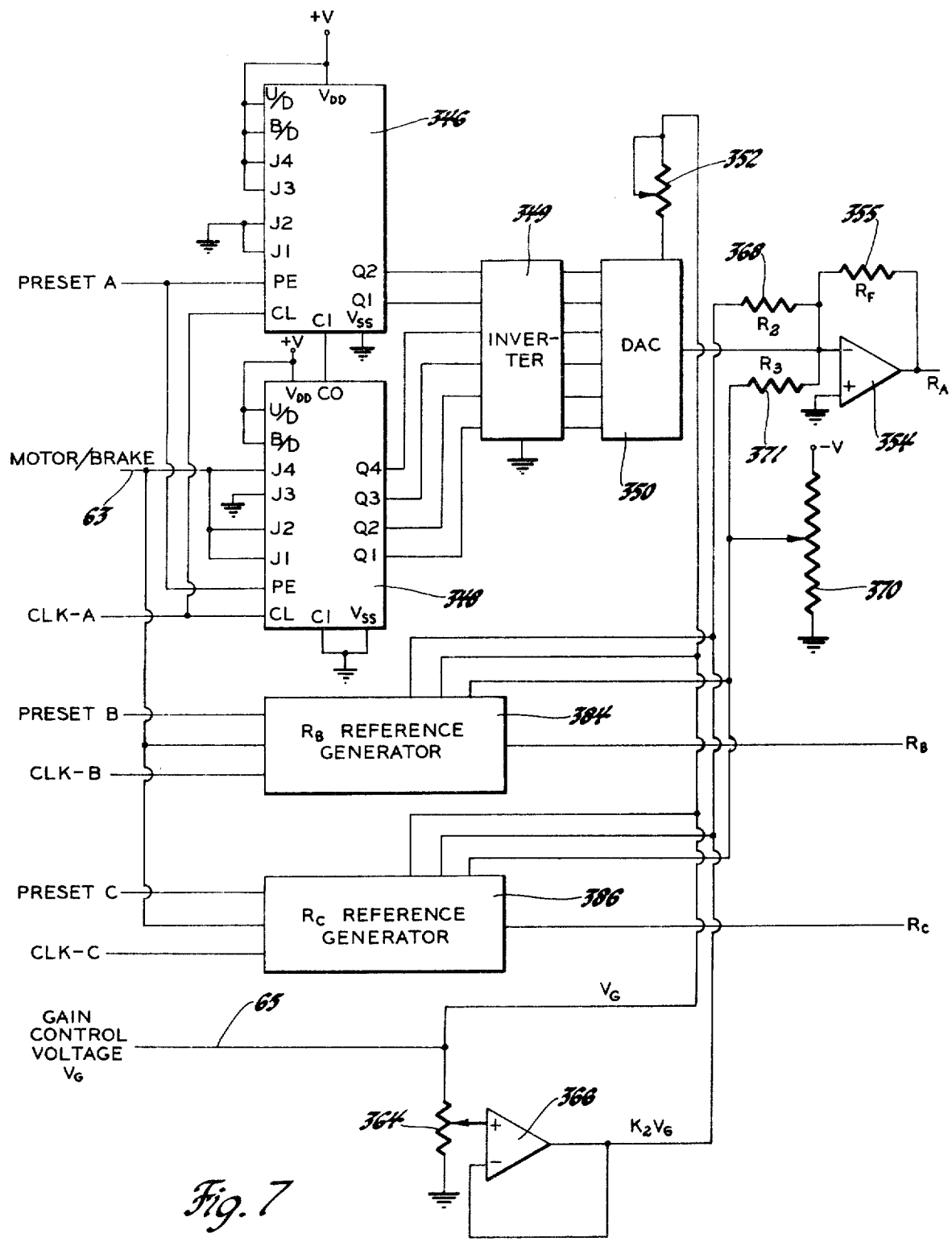
FIG. 7 is a circuit diagram of the output circuit of the motor reference generator of FIG. 1 showing the phase A, B and C counters and digital-to-analog converters.

The motor reference generator 68 is generally illustrated in FIGS. 5 through 7 with reference to the diagrams of FIGS. 8 and 9. Referring to the Figures, a divide by N counter 300 having outputs $\overline{Q}_1$ through $\overline{Q}_5$ has its $\overline{Q}_1$ and $\overline{Q}_2$ outputs coupled to respective inputs of a NAND gate 302 whose output is inverted by a NAND gate 304 and applied to its data input D so as to function as a divide by 3 counter. The output of the slip frequency controller 62 of FIG. 1, which is comprised of the voltage pulses having a frequency of $J(F_{sync})$ is coupled to the clock input of the counter 300. For purposes of illustration, it will be assumed that the constant J is equal to 360 so that the voltage pulses supplied to the clock input of the counter 300 has the frequency $360F_{sync}$. Therefore, the $\overline{Q}_1$ output of the counter 300 is a signal having a frequency $120F_{sync}$ hereinafter referred to as $120F_{sync}$, $\overline{\phi 1}$. The inverted form of this signal is illustrated in FIG. 8a. The counter 300 may take the form of the digital integrated circuit model CD 4018A manufactured by RCA, Solid State Division, Box 3,200, Somerville, N.J. 08876.

The $120F_{sync}$, $\overline{\phi 1}$ signal is coupled to the clock input of a divide by N counter 306 and the clock inputs of a divide by 10 counter 308 and a divide by 10 counter 310. The divide by N counter 306 is identical to the divide by N counter 300 and is coupled into a divide by 6 configuration by feeding back the $\overline{Q}_3$ output thereof, hereinafter referred to as $20F_{sync}$, $\phi 3$, to the data input thereof. The $\overline{Q}_1$ output of the counter 306, hereinafter referred to as $20F_{sync}$, $\phi 1$, and the $20F_{sync}$, $\phi 3$ signal are coupled to respective inputs of a NAND gate 312 whose output is coupled to the clock enable input of the counter 308. The clock enable of the counter 310 is grounded.

The counters 308 and 310 are enabled when the clock enable inputs thereof are grounded. The divide by 10 counter 308 functions in response to the enabling signal output of the NAND gate 312 and the signal $120F_{sync}$, $\overline{\phi 1}$ to sequentially supply decoded decimal outputs on 10 output lines with each output shifting to a logic 1 during a respective decimal time slot. The output signal on each of the respective lines has a frequency equal to $2F_{sync}$, each being identified respectively by $\phi 1$ through $\phi 10$. In like manner, the counter 310 functions to divide the $120F_{sync}$ $\overline{\phi 1}$ signal by 10 and supplies 10 sequential decoded decimal outputs having respective decimal time slots, each output being identified respectively as $\phi 1$ through $\phi 10$ and each having a frequency equal to $12F_{sync}$. Both counters 308 and 310 change state on the falling edge of signal $120F_{sync}$, $\phi 1$ as shown in FIG. 8. The counters 308 and 310 may take the form of the digital integrated circuit model CD 4,017A manufactured by RCA, Solid State Division, Box 3,200, Somerville, N.J. 08876.

To synchronize the operation of the group control generator 66 and the motor reference generator 68, the group signal $GP_A$ is applied to the input of a pulse generator 314 which generates a sync pulse Sy at each positive transition of the $GP_A$ signal. The sync pulses Sy are coupled to the reset inputs of the counters 306, 308 and 310 which are reset thereby. The sync pulses Sy are redundant after the first cycle since the counters will count end-around on a synchronized basis thereafter.

The $2F_{sync}$, $\phi 3$ signal from the counter 308 is supplied to one input of a NAND gate 316 of a flip-flop 318. The $2F_{sync}$, $\phi 9$ signal from the counter 308 is supplied to one input of a NAND gate 320 of the flip-flop 318. The $12F_{sync}$, $\phi 7$ signal from the counter 310 is coupled to a second input of the NAND gate 316. The MOTOR/BRAKE signal on conductor 63 from the motoring and braking control circuit 64 of FIG. 1 is coupled to a third input of the NAND gate 316, the second input of the NAND gate 320 and to an input of a NAND gate 322 of the flip-flop 318. The output of the NAND gate 316 is coupled to a second input of the NAND gate 322 and the output of the NAND gate 320 is coupled to an input of a NAND gate 324 in the flip-flop 318. The outputs of the NAND gates 322 and 324 are cross coupled to respective inputs thereof to complete the flip-flop configuration.

The output of the flip-flop 318 is a digital phase A count-up signal CUA which is applied to the data input of the first section of a shift register 326 and an input of a NAND gate 328. The shift register 326 is comprised of four sections of four stages each with the output of the last stage in each section being coupled to the data input of the following section. The output of the last stage in the shift register 326 is coupled to the data input of the first section of an identical shift register 330, the output of the last stage of which is coupled to the data input of the first section of a shift register 332 again identical to the shift register 326.

The $120F_{sync}$, $\overline{\phi 1}$ signal is inverted by a NAND gate 334 and supplied to respective clock inputs of the shift registers 326, 330 and 332. The output of the first section of the shift register 330 comprises a digital phase C count-up signal CUC which is coupled to a respective input of a NAND gate 335 and the output of the second section of the shift register 332 comprises a digital phase B count-up signal CUB which is coupled to a respective input of a NAND gate 336. The $120F_{sync}$, $\phi 1$ signal at the output of the NAND gate 334 is coupled to respective inputs of the NAND gates 328, 335 and 336.

The signal CUA is generated by setting and resetting the flip-flop 318 at the appropriate times during each half cycle of motor phase A as shown in FIG. 8. The signals CUB and CUC are generated by delaying CUA by 120° and 60°, respectively, with the use of shift registers 326, 330 and 332.

Each of the shift registers 320, 330 and 332 may take the form of the digital integrated circuit model CD 4006A manufactured by RCA, Solid State Division, Box 3,200, Somerville, N.J., 08876.

When motoring, the MOTOR/BRAKE signal on conductor 63 from the motoring and braking control 68 is a logic 1, and the counters 306, 308 and 310, the flip-flop 318, and the shift registers 326, 330 and 332 function to generate the logic signals CUA, CUB and CUC during the respective group signals $GP_A$, $GP_B$ and $GP_C$ phase displaced from one another as illustrated in FIG. 8a. When the signal CUA is at logic 1, the NAND gate 328 supplies a series of clock pulses CLK-A at a frequency equal to $120F_{sync}$. In like manner the NAND gates 335 and 336 function to generate respective series of clock pulses CLK-B and CLK-C during the time period that the CUB and CUC signals are at logic 1.

If the MOTOR/BRAKE signal from the motoring and braking control 68 is a logic 0, indicating braking of the induction motor 28 of FIG. 1, the output of the NAND gate 322 of the flip-flop 318 is a constant logic 1. Consequently, the CUA, CUB and CUC signals all shift to and remain at a logic 1 and the CLK-A, CLK-B and CLK-C signals are generated without interruption.

Referring to FIG. 6, the $12F_{sync}$, $\phi 1$ signal from counter 310 is inverted by a NAND gate 338 whose output is coupled to respective inputs of NOR gates 340, 342 and 344. The signals $2F_{sync}$, $\phi 1$, $2F_{sync}$, $\phi 4$ and $2F_{sync}$, $\phi 7$ from counter 308 are connected to second inputs of NOR gates 340, 342 and 344, respectively. The output of the NOR gates 340, 342 and 344 comprise the pulses PRESET A, PRESET C and PRESET B as illustrated in FIG. 8a, each occurring with each state change of the respective group signal $GP_A$, $GP_C$ and $GP_B$.

Referring to FIG. 7, a pair of counters 346 and 348 are serially connected and function to count pulses supplied to the clock inputs thereof and supply on respective output lines a 6-bit, binary indication of the number of pulses counted. These output lines are coupled to respective inputs of an inverter 349. The CLK-A signal is supplied to the clock inputs of the counters 346 and 348, the MOTOR/BRAKE signal is coupled to selected preset inputs of the counters 346 and 348 and the PRESET A signal is coupled to the preset enable inputs of the counters 346 and 348. A positive voltage V+ from a suitable power supply is coupled to the counters 346 and 348.

During motoring, the MOTOR/BRAKE signal is a logic 1 and upon the occurrence of the PRESET A signal, the counters 346 and 348 are set to a preselected number designated at the J1, J2, J3 and J4 jam inputs. When the CUA signal changes to logic 1, the CLK-A pulses are supplied to the clock inputs of the counters 346 and 348 which in turn generate a binary indication on the output lines thereof representing the sum of the number of pulses supplied thereto and the preset number. The inverter 349 functions to invert the respective outputs of the counters 346 and 348 and supplies the inverted signals to a digital-to-analog converter 350. Each of the counters 346 and 348 may take the form of the digital integrated circuit model CD 4,029A manufactured by RCA, Solid State Division, Box 3,200, Somerville, N.J. 08876.

Assuming a maximum count of 63 by the counters 346 and 348, the output of the digital-to-analog converter 350 is a current defined by the expression $$I_1 = -V_G K_1 N \quad (1)$$

where $K_1$ is a constant, $V_G$ is the magnitude of the gain control voltage coupled to the digital-to-analog converter 350 through the resistor 352 from the conductor 65 and N is the number stored in the counters 346 and 348. This output is coupled to the negative input of an operational amplifier 354 having a feedback resistor 355 with a resistance $R_F$. As the counter 346 and 348 count the input pulses supplied thereto, the output of the digital-to-analog converter 350 is a negative increasing stepped current waveform having a magnitude represented by equation (1) which is converted to a positive increasing stepped voltage $R_A$ by the amplifier 354. The magnitude of each of the stepped increments and consequently the magnitude of the current $I_1$ and voltage $R_A$ can be directly controlled by varying the magnitude $V_G$ of the gain control voltage applied to the gain adjustment resistor 352. The digital-to-analog converter 350 may take the form of model MC 1406L manufactured by Motorola, Box 20,912, Phoenix, Ariz. 85,036.

The gain control voltage having the magnitude $V_G$ represents a specific braking or motor command on the conductor 65 from the motoring and braking control 64 and is coupled to the digital-to-analog converter 350. This gain control voltage is effective for controlling the gain of the digital-to-analog converter 350.

The gain control signal on conductor 65 is further coupled to ground across a potentiometer 364 whose wiper arm is coupled to a buffer amplifier 366 having unit gain. The output of the amplifier 366 is coupled to the negative input of the operational amplifier 354 through a resistor 368 having a resistance $R_2$. The current input to the operation amplifier 354 from the amplifier 366 is defined by the expression $$I_2 = (K_2 V_G/R_2) = K_3 V_G \quad (2)$$

where $K_2$ is a constant determined by the setting of the potentiometer 364, $R_2$ is the resistance of the resistor 368, $K_3 = (K_2/R_2)$ and $V_G$ is the magnitude of the gain control voltage.

A potentiometer 370 is coupled between the source of negative voltage V− and ground and supplies a negative current to the negative input of the operational amplifier 354 through a resistor 371 having a resistance $R_3$. The current supplied to the operational amplifier 354 from the potentiometer 370 is defined by the expression $$I_3 = -K_4/R_3 = -K_5 \quad (3)$$

where $K_3$ is a constant determined by the setting of the potentiometer 370, $R_3$ is the resistance of the resistor 371 and $K_5$ is a constant.

The output of the operational amplifier is the motor reference signal $R_A$ which has an amplitude defined by the expression $$R_A = -R_F (I_1 + I_2 + I_3)$$
$$= V_G (R_F K_1 N - R_F K_3) + R_F K_5 \quad (4)$$

For a given setting of the potentiometer 364 establishing a particular value of $K_3$, the expression within the brackets of equation (4) goes to zero for a specific count output of the counters 346 and 348 for all values of $V_G$. This point will hereinafter be referred to as the zero gain point for the motor reference signal $R_A$. At that count, the motor reference signal $R_A$ is equal to the expression $R_F K_5$ of equation (4), the magnitude of which is controlled by adjusting the magnitude of $K_5$ with the potentiometer 370. As can be seen from equation (4), the expression $R_F K_5$ functions to establish a bias for the curve established by the expression $V_G (R_F K_1 N - R_F K_3)$.

The generation of the motor reference signal $R_A$ will now be described with reference to FIGS. 7 and 8. Assuming the MOTOR/BRAKE signal is a logic 1 representing motoring, upon the occurrence of the signal PRESET A, the counters 346 and 348 are preset to a preselected value which may be, for example, 11. The counters 346 and 348 remain in this state until the count-up signal CUA shifts to a logic 1 to enable the NAND gate 328 of FIG. 5 to supply the signal CLK-A at the frequency $120F_{sync}$ to clock the counters 346 and 348. Thereafter, the output of the counters 346 and 348 is a binary representation of the number of pulses supplied thereto plus the initial preset value. With each pulse counted by the counters 346 and 348, the digital-to-analog converter 350 increases the magnitude of the signal supplied to the operational amplifier 354 by a value determined by the magnitude $V_G$ of the gain control. As seen in FIG. 8a, it is assumed that the magnitude $V_G$ of the gain control voltage, the outputs of the voltage dividers 364 and 370 are such that with the count of 11 preset into the counters 346 and 348, the output of the operational amplifier 354 is equal to 0.25 volts. The output current from the digital-to-analog converter 350 continues to increase in stepwise manner in accordance with each count of the counter 346 and 348 and the magnitude $V_G$ of the gain control voltage until the CUA signal shifts to logic 0 to inhibit the NAND gate 328 from generating the CLK-A pulses. As seen in FIG. 8a, the magnitude of the output of the operational amplifier 354 in the specific example is at this time equal to 4.25 volts. Upon the occurrence of the next pulse PRESET A, the counters 346 and 348 are preset and the cycle is repeated. The resulting waveform is the desired truncated sawtooth waveform for controlling the firing angle delay of the control switches in the groups A+ and A− during motoring.

To provide for braking, the vehicle operator causes the motoring and braking control 68 to supply a logic 0 to the preset inputs of the counters 346 and 348 and also to cause the signals CUA, CUB, and CUC to be maintained at a logic 1 as previously described so as to continually maintain the NAND gates 328, 324 and 336 enabled to supply the respective output clock pulses CLK-A, CLK-B and CLK-C. Consequently, upon the occurrence of the pulse PRESET A, the counters 346 and 348 are reset to 0 and, after the pulse PRESET A changes to a logic 0, the counters 346 and 348 begin to count the CLK-A pulses. Also upon generating the logic 0 MOTOR/BRAKE signal, the vehicle operator causes the motoring and braking control 68 to decrease the magnitude $V_G$ of the gain control voltage to reduce the gain of the digital-to-analog converter 350 to effect the decrease of the magnitude of each incremental step of the output waveform thereof. The output of the operational amplifier 354 continues to increase in stepwise fashion until the next pulse PRESET A at which time the counters 346 and 348 are again set to 0 after which the cycle is then repeated. The resulting signal is the conventional sawtooth waveform illustrated in FIG. 8b varying in amplitude from 1.0 volts to 4.0 volts. Due to the time delay through the various circuit elements, the trailing edge of the motor reference signal $R_A$ occurs after the state change of the group signal $GP_A$.

Referring to FIGS. 9a and b, one of the significant features of the motor reference generator 68 will be described. For a given setting of the potentiometer 364, the zero gain point for the motor reference signal $R_A$ is established about which the motor reference signal $R_A$ can be compressed or expanded by varying the gain control voltage $V_G$. In FIG. 9a, the sawtooth waveform 372 is shown for one specific magnitude $V_G$ of the gain control voltage and the curve 374 is a sawtooth waveform shown with a decreased magnitude $V_G$ of the gain control voltage. As can be seen by the FIG. 9a, the point of intersection of the curves 372 and 374 at point 376 is established by the potentiometer 364 and remains constant for all values of $V_G$. In this manner, the range of trigger delay angles of the controlled switches in groups A+ and A− can be varied so as to control the amplitude of the phase A signal to the induction motor winding 30-A. Although FIG. 9a illustrates the motor reference signal $R_A$ during braking, it is applicable also to the truncated sawtooth waveform generated for motoring. Further, the curves may be biased upward or downward by varying the setting of potentiometer 370.

FIG. 9b illustrates the motor reference signal $R_A$ for a second setting of the potentiometer 364 with two magnitudes of gain control voltage. The sawtooth waveform 378 is established by a first magnitude $V_G$ of the gain control voltage and the sawtooth waveform 380 is established by a second magnitude of the gain control voltage. As can be seen, the point of intersection 382 of the sawtooth waveforms 378 and 380 is shifted as a function of the potentiometer 364 and remains constant for that setting. In the foregoing manner, the zero gain point for the motor reference signal $R_A$ can be established about which it may be compressed or expanded. Further, by varying the potentiometer 370, the sawtooth waveforms 372 through 380 can be biased up or down without altering the relative intersection points 376 and 382.

The motor reference signals $R_B$ and $R_C$ are generated by the $R_B$ and $R_C$ reference generators 384 and 386 in identical manner as the motor reference signal $R_A$ in response to the pulses PRESET B and PRESET C and the clock signals CLK-B and CLK-C which establish the desired phase relationships between the motor reference signals $R_A$, $R_B$ and $R_C$.

Due to the absence of timing elements in the motor reference generator 68, the generator is not frequency dependent and can operate to generate true sawtooth waveforms at all speeds of the induction motor 28 down to zero speed. Further, since the gain control voltage is applied to all three reference generators $R_A$, $R_B$ and $R_C$, the amplitudes of all three reference signals are controlled simultaneously. The nature of this circuit is such that $R_A$, $R_B$ and $R_C$ can be identical in shape and amplitude, can be exactly 120° apart, can be controlled together as one with respect to shape and amplitude, and can have very low drift since amplitudes are determined by digital signals and only a few resistor ratios.

The detailed description of the preferred embodiment of this invention for the purpose of explaining the principles thereof is not to be considered as limiting or restricting the invention since many modifications may be made by the exercise of skill in the art without departing from the scope of the invention.

What is claimed is:

1. A system for supplying an alternating signal at a desired frequency to a load comprising: a polyphase voltage generator for generating polyphase line-to-neutral voltages; a converter coupled between the voltage generator and the load including a pair of polyphase full wave bridge rectifiers, one of said pair of bridge rectifiers including a first set of controlled rectifiers poled for supplying positive current to the load and a second set of controlled rectifiers poled for returning said positive current to the voltage generator and the other of said pair of bridge rectifiers including a third set of controlled rectifiers poled for supplying negative current to the load and a fourth set of controlled rectifiers poled for returning said negative current to the voltage generator; means for generating a number of waveforms each having alternating states, each state representing the firing angle range of a respective controlled rectifier in each fullwave bridge rectifier; means for generating a number of source reference waveforms each having an instantaneous amplitude representing the firing delay angle of a respective controlled rectifier in each full-wave bridge rectifier and having a fast falling trailing edge, the state of the waveform representing the firing angle range of one of the controlled rectifiers coinciding with the source reference waveform whose instantaneous amplitude represents the firing delay angle thereof; means for generating a series of square waves at the desired frequency of the alternating signal, each of said square waves having alternating first and second states; means for generating a series of load reference waveforms having a period coincident with each state of the square waves, each load reference waveform having an instantaneous amplitude representing a desired controlled rectifier firing delay angle and having a fast falling trailing edge; comparator means responsive to the amplitudes of the source reference waveforms and the load reference waveforms for generating firing commands for each of the controlled rectifiers; a number of bistable multivibrators, each of said multivibrators having an output coupled to a respective one of the controlled rectifiers in the pair of full wave bridge rectifiers; means for selectively setting the multivibrators coupled to the controlled rectifiers in the first and second sets to selectively gate said controlled rectifiers into conduction, each one of said last mentioned multivibrators being set upon the simultaneous occurrence of the first state of the square wave signal, the state of the waveform representing the firing angle range of the controlled rectifier coupled thereto and the firing command for the controlled rectifier coupled thereto; means for selectively setting the multivibrators coupled to the controlled rectifiers in the third and fourth sets to selectively gate said controlled rectifiers into conduction, each one of said last mentioned multivibrators being set upon the simultaneous occurrence of the second state of the square wave signal, the state of the waveform representing the firing angle range of the controlled rectifier coupled thereto and the firing command for the controlled rectifier coupled thereto; and means for resetting each multivibrator coupled to a controlled rectifier in a respective one of the first, second, third and fourth sets upon the setting of another one of the multivibrators coupled to a controlled rectifier in the same set, whereby the controlled rectifiers in the pair of full wave bridge rectifiers are selectively gated into conduction to supply the alternating signal at the desired frequency to the load.

2. A system for supplying an alternating signal at a desired frequency to a load comprising: a polyphase voltage generator for generating polyphase line-to-neutral voltages; a converter coupled between the voltage generator and the load including a pair of polyphase full wave bridge rectifiers, one of said pair of bridge rectifiers including a first set of controlled rectifiers poled for supplying positive current to the load and a second set of controlled rectifiers poled for returning said positive current to the voltage generator and the other of said pair of bridge rectifiers including a third set of controlled rectifiers poled for supplying negative current to the load and a fourth set of controlled rectifiers poled for returning said negative current to the voltage generator; means coupled to the voltage generator and responsive to each line-to-line voltage therefrom for generating a respective series of source reference waveforms synchronized with each line-to-line zero voltage crossover, each source reference waveform having a first state coincident with the firing angle range of a respective controlled rectifier in each of the first and third sets of controlled rectifiers and a second state coincident with the firing angle range of a respective controlled rectifier in each of the second and fourth sets of controlled rectifiers; means responsive to each series of source reference waveforms for generating a respective series of sawtooth waveforms having a period coincident with each state thereof, each sawtooth waveform having an instantaneous amplitude directly proportional to the firing delay angle of the controlled rectifiers whose firing angle range is represented by the state of the source reference waveform coincident therewith; means for generating a series of square waves at the desired frequency, each of said square waves having first and second states; means for generating a series of load reference signals having a period coincident with each state of the series of square waves, each load reference signal having an instantaneous amplitude representing a desired controlled rectifier firing delay angle and having a fast falling trailing edge; comparator means for individually comparing the instantaneous amplitude of each of the series of sawtooth waveforms with the instantaneous amplitude of the series of load reference signals and generating respective series of clock pulses, each clock pulse having a triggering edge occurring when the instantaneous magnitude of the series of load reference signals equals the instantaneous magnitude of a respective one of the sawtooth waveforms, said triggering edge representing a firing command for the controlled rectifiers whose firing delay angle is represented by said sawtooth waveform; a number of bistable multivibrators, each of said multivibrators having an output coupled to a respective one of the controlled rectifiers in the pair of full wave bridge rectifiers; means for selectively setting the multivibrators coupled to the controlled rectifiers in the first and second sets to selectively gate said controlled rectifiers into conduction, each one of said last mentioned multivibrators being set upon the simultaneous occurrence of the first state of the series of square waves, the state of the source reference waveform coincident with the firing angle range of the controlled rectifier coupled thereto and the firing command for the controlled rectifier coupled thereto; means for selectively setting the multivibrators coupled to the controlled rectifiers in the third and fourth sets to selectively gate said controlled rectifiers into conduction, each one of said last mentioned multivibrators being set upon the simultaneous occurrence of the second state of the series of square waves, the state of the source reference waveform coincident with the firing angle range of the controlled rectifier coupled thereto and the firing command for the controlled rectifier coupled thereto; and means for resetting each multivibrator coupled to a controlled rectifier in a respective one of the first, second, third and fourth sets upon the setting of another one of the multivibrators coupled to a controlled rectifier in the same set, whereby the controlled rectifiers in the pair of full wave bridge rectifiers are selectively gated into conduction to supply the alternating signal at the desired frequency to the load.

3. A system for supplying an alternating signal at a desired frequency to a load comprising: a polyphase voltage generator for generating polyphase line-to-neutral voltages; a converter coupled between the voltage generator and the load including a pair of polyphase full wave bridge rectifiers, one of said pair of bridge rectifiers including a first set of controlled rectifiers poled for supplying positive current to the load and a second set of controlled rectifiers poled for returning said positive current to the voltage generator and the other of said pair of bridge rectifiers including a third set of controlled rectifiers poled for supplying negative current to the load and a fourth set of controlled rectifiers poled for returning said negative current to the voltage generator; means coupled to the voltage generator and responsive to each line-to-line voltage therefrom for generating a respective series of source reference waveforms synchronized with each line-to-line zero voltage crossover, each source reference waveform having a first state coincident with the firing angle range of a respective controlled rectifier in each of the first and third sets of controlled rectifiers and a second state coincident with the firing angle range of a respective controlled rectifier in each of the second and fourth sets of controlled rectifiers; means responsive to each series of source reference waveforms for generating a respective series of sawtooth waveforms having a period of coincident with each state thereof, each sawtooth waveform having an instantaneous amplitude directly proportional to the firing delay angle of the controlled rectifiers whose firing angle range is represented by the state of the source reference waveform coincident therewith; means for generating a series of square waves at the desired frequency, each of said square waves having first and second states; means for generating a series of load reference signals having a period coincident with each state of the series of square waves, each load reference signal having an instantaneous amplitude representing a desired controlled rectifier firing delay angle and having a fast falling trailing edge; comparator means for individually comparing the instantaneous amplitude of each of the series of sawtooth waveforms with the instantaneous amplitude of the series of load reference signals and generating respective series of clock pulses, each clock pulse having a triggering edge occurring when the instantaneous magnitude of the series of load reference signals equals the instantaneous magnitude of a respective one of the sawtooth waveforms, said triggering edge representing a firing command for the controlled rectifiers whose firing delay angle is represented by said sawtooth waveform; a number of bistable multivibrators, each of said multivibrators having an output coupled to a respective one of the controlled rectifiers in the pair of full wave bridge rectifiers; means for selectively setting the multivibrators coupled to the controlled rectifiers in the first and second sets to generate trigger signals to selectively gate said controlled rectifiers into conduction, each one of said last mentioned multivibrators being set upon the simultaneous occurrence of the first state of the series of square waves, the state of the source reference waveform coincident with the firing angle range of the controlled rectifier coupled thereto and the firing command for the controlled rectifier coupled thereto; means for selectively setting the multivibrators coupled to the controlled rectifiers in the third and fourth sets to generate trigger signals to selectively gate said controlled rectifiers into conduction, each one of said last mentioned multivibrators being set upon the simultaneous occurrence of the second state of the series of square waves, the state of the source reference waveform coincident with the firing angle range of the controlled rectifier coupled thereto and the firing command for the controlled rectifier coupled thereto; means for resetting each multi-vibrator coupled to a controlled rectifier in a respective one of the first, second, third and fourth sets upon the setting of another one of the multivibrators coupled to a controlled rectifier in the same set; and a number of inhibit circuits, each having an output coupled to the output of a respective one of the multivibrators, each one of the inhibit circuits coupled to a respective one of the multivibrators generating a trigger signal for a controlled rectifier in one of the pair of full wave bridge rectifiers being responsive to the coexistence of the trigger signal generated by the multivibrator for the controlled rectifier in the other one of the pair of full wave bridge rectifiers which could conduct with said controlled rectifier in the first mentioned one of the pair of full wave bridge rectifiers and the state of the series of source reference waveforms representing the period of possible conduction between said controlled rectifiers in the pair of full wave bridge rectifiers for inhibiting the generation of a trigger signal waveform for inhibiting the generation of a gate signal and each of the inhibiting circuits coupled to the output of the gate signal generators controlling the controlled switches in the third and fourth sets each being responsive to the coexistence of the state of one of the source reference waveforms and the generation of a gating signal for the controlled switch in the first and second groups which would conduct therewith during said state of the source reference waveform for inhibiting the generation of a gate signal whereby the controlled rectifiers in the pair of full wave bridge rectifiers are selectively gated conductive to supply an alternating signal at the desired frequency to the load.

* * * * *